United States Patent [19]

Long

[11] Patent Number: 5,203,147

[45] Date of Patent: Apr. 20, 1993

[54] LAWN MOWER ACTIVATION SWITCH

[75] Inventor: Charles K. Long, Seneca, S.C.

[73] Assignee: Ryobi Motor Products Corp., Easley, S.C.

[21] Appl. No.: 824,185

[22] Filed: Jan. 22, 1992

[51] Int. Cl.$^5$ .............................................. A01D 75/00
[52] U.S. Cl. ....................................... 56/10.1; 56/10.5
[58] Field of Search ...................... 56/10.1, 10.2, 10.5, 56/10.8

[56] References Cited

U.S. PATENT DOCUMENTS

| | | |
|---|---|---|
| 3,230,695 | 1/1966 | West . |
| 3,298,163 | 1/1967 | Ottosen et al. . |
| 3,500,620 | 3/1970 | Duran et al. . |
| 3,564,186 | 2/1971 | Mittelstadt . |
| 3,985,196 | 10/1976 | Deschamps ...................... 56/10.5 X |
| 4,466,308 | 8/1984 | Kester et al. . |
| 4,476,643 | 10/1984 | Hilchey et al. . |
| 4,531,347 | 7/1985 | Schutz ................................... 56/10.5 |
| 5,085,043 | 2/1992 | Hess et al. ............................ 56/10.5 |

Primary Examiner—Thuy M. Bui
Attorney, Agent, or Firm—Brooks & Kushman

[57] ABSTRACT

The switch has a housing adapted to receive a lever shiftable relative thereto between an ON position and an OFF position for activating an electric lawn mower. An activator button is movably affixed to the housing, such that the activator button is movable in a first degree of freedom relative to the housing between an ACTIVE position and a STOP position. The activator button is also movable in a second degree of freedom relative the housing between a READY orientation and a RUN orientation in response to movement of the lever to the ON position. A biasing means cooperates with the housing and the activator button for biasing the activator button toward the STOP position and the READY orientation. A normally open electrical switch is affixed on the housing for starting the electric mower. The electrical switch is closeable only when the activator button is moved to the RUN orientation. A detent cooperates with the housing and the activator button when the activator button is in the RUN orientation to prevent the biasing means from biasing the activator button to the STOP position.

16 Claims, 2 Drawing Sheets

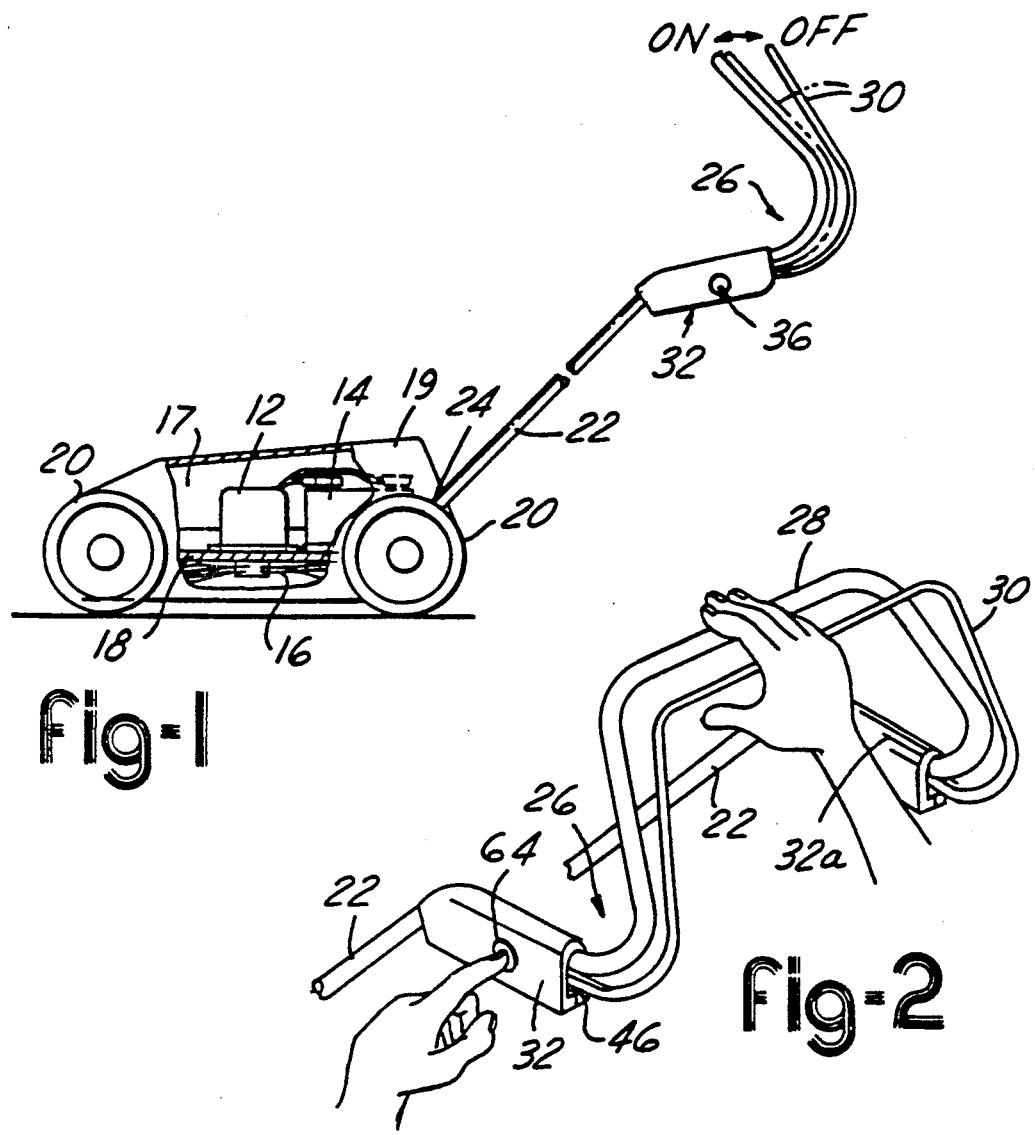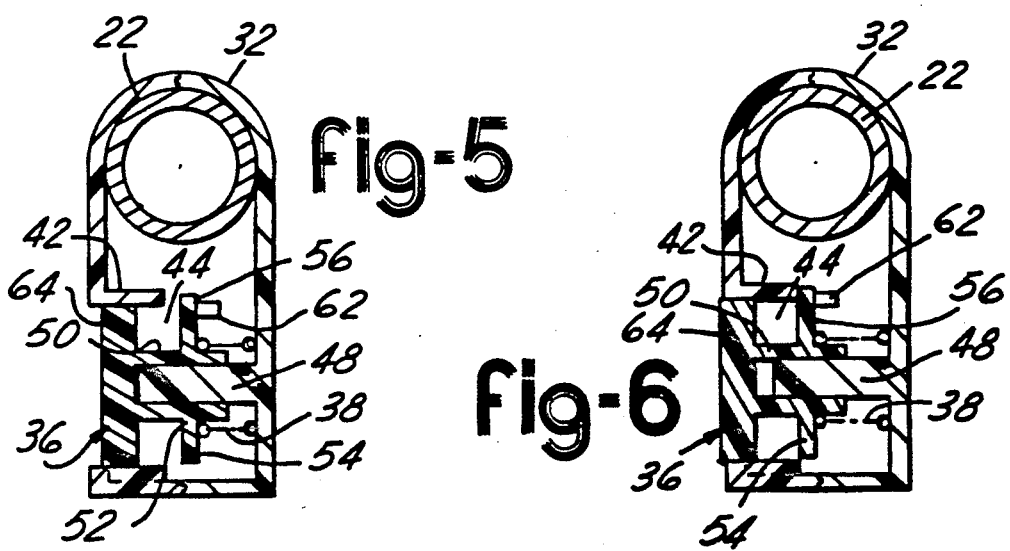

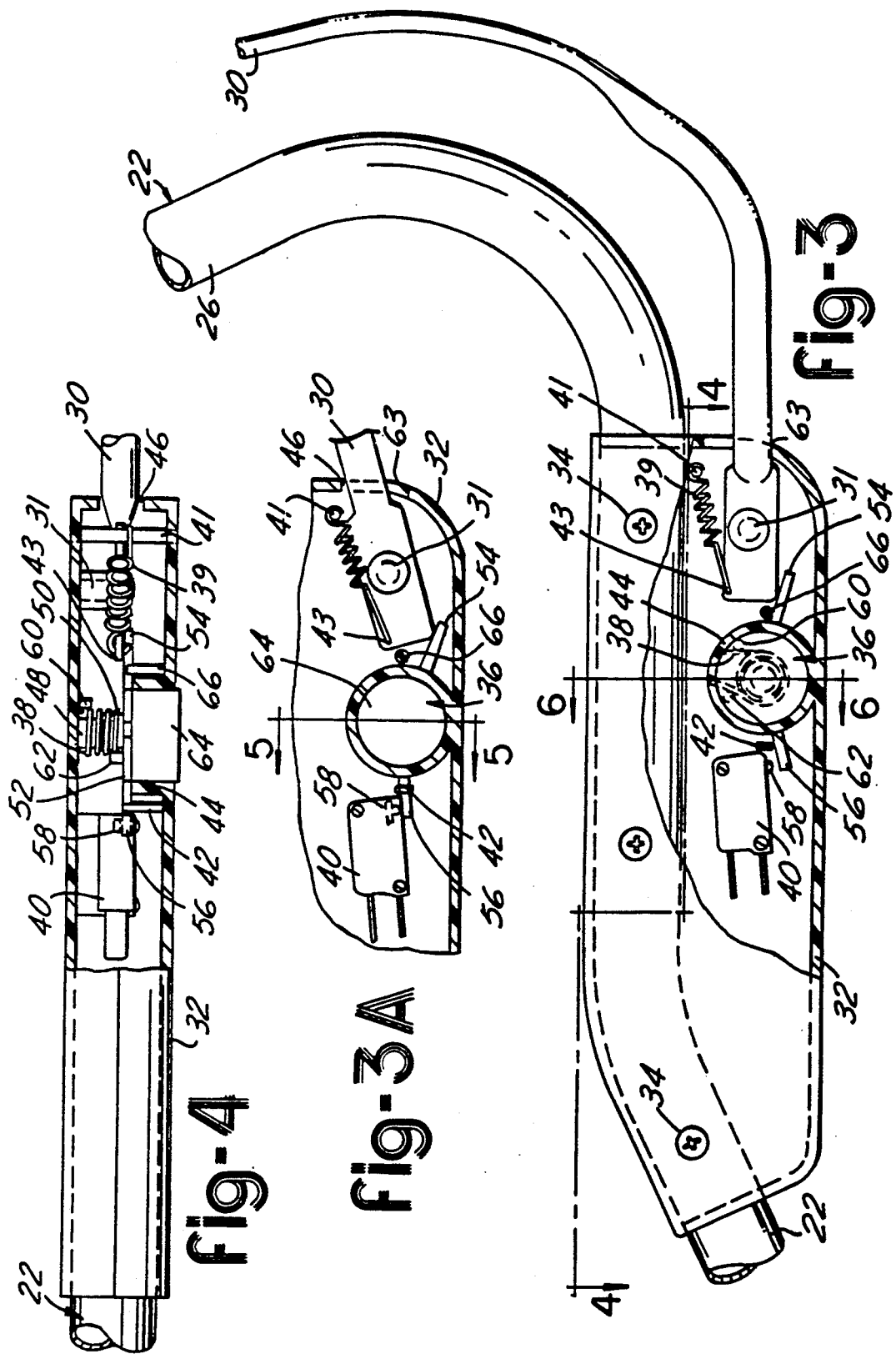

LAWN MOWER ACTIVATION SWITCH

TECHNICAL FIELD

This invention relates to an activation switch, and more particularly to an activation switch for use with an electric lawn mower.

BACKGROUND ART

Traditionally, electric lawn mower construction has consisted of a single switch to activate the lawn mower. Accordingly, it was possible to activate the lawn mower with one hand. Examples of such a configuration may be seen in U.S. Pat. No. 3,500,620 to Duran et al. and U.S. Pat. No. 3,298,163 to Ottosen et al.

Lawn mowers then provided a remote control lever for operating the on/off switch with a motor for an electric mower to enable the operator to stand a distance from the housing when engaging the motor. An example of such a configuration is disclosed in U.S. Pat. No. 3,564,186 to Mittelstadt. Subsequently, handles or control bars were utilized which were spring-biased to an OFF position which required that both switches be placed to an ON position to start the electric motor as disclosed in U.S. Pat. No. 3,230,695 to West.

Eventually, the dual control switches were incorporated into a generally U-shaped, one-piece handle commonly referred to as a bail bar to provide improved operator control and minimize fatigue associated with holding onto two separate switches. Such a configuration is disclosed in U.S. Pat. No. 4,476,643 to Hilchey et al.

In 1984, in response to existing and proposed standards for lawn mowers, U.S. Pat. No. 4,466,308 to Kester et al. disclosed a control assembly for lawn mowers including a dead-man function requiring two distinct steps for starting of the lawn mower engine.

On Dec. 8, 1989, Underwriters Laboratory, Inc. published a revised standard for electric lawn mowers under UL 1447, 2nd Edition, Section 26, which required that:

the lawn mower be provided with a means that must be manually actuated before the blade or blades can be restarted such that the means may be either a control that is separate from the blade control or it may be incorporated into the blade control's double action device that requires two separate actions to restart the blade or blades.

Underwriters Laboratory 1447, 2nd Edition, Section 26 is incorporated herein by reference.

The present invention is directed to improving known activation switches for electric lawn mowers while adopting Underwriters Laboratories 1447, 2nd Edition, Section 26 requirements.

SUMMARY OF THE INVENTION

An object of the present invention is to provide an electric lawn mower with an activator button for activating the electric motor of the lawn mower.

Another object of the present invention is to provide an activator switch for an electric lawn mower requiring the use of both hands of the operator to activate the lawn mower.

An additional object of the present invention is to provide an activator switch which is inexpensive to manufacture and utilizes a limited number of components.

A further object of the present invention is to provide an activator switch which can be incorporated into a great number of models of electric lawn mowers.

Still another object of the present invention is to provide a method of activating an electric lawn mower having an activation switch.

A further object of the present invention is to provide a motor starting device for use with an electric lawn mower. A housing is provided which contains an activator button movable in two degrees of freedom. The first degree of freedom is axial movement between an extended or STOP position and a depressed or ACTIVE position. The second degree of freedom is rotational movement between a horizontal READY orientation and a vertical or RUN orientation. The activator button cooperates with a bail bar which pivots between an upward or ON position and a downward or OFF position. The bail bar rotates the activator button to the RUN orientation so that the activator button can engage an electrical switch to close the electrical circuit to activate the motor.

Accordingly, to obtain the above objects of the present invention, an electric lawn mower is provided having an electric motor for driving a cutting blade. A mower deck is provided having a plurality of wheels for movably supporting the cutting blade relative to a lawn to be cut. A handle is provided having a first end affixed to the mower deck and a second end adapted to cooperate with an operator using the mower. A bail bar is provided which is shiftable with respect to the handle between an ON position and an OFF position. An activator button is provided which is movable with respect to the handle in a first degree of freedom between an ACTIVE position and a STOP position. The activator button is movable with respect to the handle when the activator button is in the ACTIVE position for movement in a second degree of freedom between a READY orientation and a RUN orientation in response to movement of the bail bar from the OFF position to the ON position. A biasing means cooperates with the handle and the activator button for biasing the activator button toward the READY orientation and for biasing the activator button toward the STOP position. A normally open electrical switch is provided for activating the electric motor, the switch being closeable only when the activator button is moved to the RUN orientation and the bail bar is shifted to the ON position. A detent cooperates with the switch and the activator button when the activator button is in the RUN orientation to prevent the biasing means from biasing the activator button to the STOP position.

The above objects, features, and advantages of the present invention are readily apparent from the following detailed description of the best mode for carrying out the invention when taken in with the accompanying drawings.

BRIEF DESCRIPTION OF THE DRAWINGS

FIG. 1 is a side view of the lawn mower and activation switch partially broken away showing a portion of the internal elements of the present invention;

FIG. 2 is a perspective view of the activation switch and handle region of the invention in accordance with the present invention;

FIG. 3 is a side view of the region shown in FIG. 2 partially broken away showing a portion of the internal elements of the present invention and the activator button when in the READY orientation;

FIG. 3A is a partial side view similar to that shown in FIG. 3 broken away showing the activator switch in the RUN orientation in response to the bail bar being in the ON position;

FIG. 4 is plan view of the invention taken along line 4—4 of FIG. 3 broken away showing the internal elements of the activation switch;

FIG. 5 is an end view taken along line 5—5 of FIG. 3 showing a portion of the internal elements of the activation switch when the activator switch is in the STOP position; and FIG. 6 is an end view taken along line 6—6 of FIG. 3 showing a portion of the internal elements of the activation switch when the activator switch in the ACTIVE position.

BEST MODE FOR CARRYING OUT THE INVENTION

The preferred embodiment as shown in FIGS. 1 through 6, illustrate an electric lawn mower generally indicated at 10. The lawn mower 10 has an electric motor 12 which receives power from an on-board battery 14. The electric motor 12 drives a cutting blade 16 for cutting grass. The electric motor 12 and the battery 14 are housed within a cavity 17 defined by a mower deck 18 and a cover 19. Although the lawn mower 10 of the present invention is shown with an on-board battery 14, the invention is not limited to battery operated lawn mowers 10. The cutting blade 16 is located below the mower deck 18. A plurality of wheels 20 (in this embodiment 4 wheels are utilized) are attached to the mower deck 18 to movably support the mower deck 18 and the cutting blade 16 relative to the grass to be cut.

A handle 22 is affixed at a first end 24 to the mower deck 18. The handle is generally a C-shaped member having an open first end 24 and a closed second end 26. As shown in FIGS. 1 and 2, the second end 26 is adapted to cooperate with the hands of an operator. Specifically, the second end 26 has a generally horizontal bend and then is curved and angled back toward the cover 19 at an approximate angle of 45 degrees from the vertical. The second end 26 has a generally horizontal portion 28 for comfortable placement of the operator's hands.

As shown in FIGS. 1 through 3, a bail bar 30 is shiftably mounted adjacent the handle 22. The bail bar 30 has a similar configuration as the second end 26 of the handle. In this embodiment, the bail bar 30 is pivotally mounted below the handle 22 so as to be movable between an ON position as shown in FIG. 3A (or as shown in FIG. 1 as position A) and an OFF position as shown in FIGS. 2 and 3 (or as shown in FIG. 1 as position B). The bail bar 30 is pivotally mounted about a pivot pin 31.

An activator housing 32 as shown in FIGS. 1 through 6 is affixed to the handle 22 by screws 34 or other conventional fastening means. A similarly shaped housing 32A is affixed to the other side of the handle 22 for pivotally mounting the other side of the bail bar 30. The housing 32A does not contain the other elements described below. The activator housing 32 houses an activator button 36, a first spring 38, a second spring 39, an electrical switch 40, and a detent 42. The activator housing 32 defines a first aperture 44 which surrounds and guides the activator button 36. A second aperture 46 is located within the activator housing 32 and is adapted to receive the bail bar 30 enabling pivotal movement of the bail bar 30 about the pivot pin 31 affixed to the activator housing 32.

As shown in FIGS. 5 and 6, the activator button 36 is axially movable with respect to the handle 22 in a first degree of freedom between an ACTIVE position and a STOP position. As shown in FIGS. 3 and 3A, the activator button 36 is rotationally movable in a second degree of freedom when in the ACTIVE position between a READY orientation and a RUN orientation.

The activator button 36, as shown in FIGS. 3, 3A, 4, and 5 cooperates with a guide pin 48 having a generally circular cross section. The guide pin 48 is affixed along its central axis to the activator housing 32 with respect to the handle 22. The activator button 36 has a first member 50 having a generally cylindrical configuration. The first member 50 slidably and pivotally cooperates with the guide pin 48 along its central axis. The axis of the guide pin 48 and the first member 50 is generally parallel to the pivot pin 31 allowing for coordinated movement of the activator button 36 and the bail bar 30.

The slidable movement of the first member 50 relative to the guide pin 48 results in the first degree of freedom of the activator button 36, i.e. movement of the activator button 36 between the ACTIVE (depressed) position and the STOP (extended) position. The rotational movement of the first member 50 relative the guide pin 48 allows the activator button 36 to move in the second degree of freedom, i.e., between the READY (horizontal) orientation (shown in FIG. 3) and the RUN (vertical) orientation (shown in FIG. 3A).

A body 52 is affixed to the first member 50. The body 52 has a first arm 54 cooperating with the bail bar 30 enabling rotational movement of the body 52 and the first member 50 in the second degree of freedom between the READY orientation and the RUN orientation. This rotational movement is in response to movement of the bail bar 30 from the OFF position to the ON position when the activator button 36 is in the ACTIVE position. The body 52 has a second arm 56 which cooperates with a contact button 58. The contact button 58 biased outward from the electrical switch 40 resulting in the electrical switch 40 being normally open. The electrical switch 40 is affixed to the activator housing 32 relative the handle 22. The second arm 56 only engages the contact button 58 when the activator button 36 is in the READY orientation and rotated in the second degree of freedom in response to movement of the bail bar 30 to the ON position.

FIGS. 4 and 6 show a first retaining pin 60 affixed to the activator housing 32 for retaining one end of the first spring 38. A second retaining pin 62 is affixed to the body 52 for retaining the opposite end of the first spring 38. The first spring 38 is a torsional spring which is force fit over the first member 50 at the end adjacent the second retaining pin 62 and the other end of the first spring 38 is loosely fit over the guide pin 48. The cooperation of the first and second retaining pins 60 and 62 and the first spring 38 result in the activator button 36 being biased in two directions. The first direction is to bias the activator button toward the OFF position based on the resistance to compression of the first spring 38. The second direction is to bias the activator button 36 to the READY orientation resulting from the torsional resistance to rotation of the first spring 38 caused by movement of the activator button 36 to the RUN orientation in response to movement of the bail bar to the ON position.

The second spring 39 assists in biasing of the activator button 36 toward the STOP position. An anchor pin 41 anchors one end of the second spring 39 to the activator housing 32. The other end of the second spring 39 is secured to an opening 43 in the bail bar 30 such that the second spring 39 biases the bail bar 30 toward the OFF position. When the bail bar 30 moves toward the ON position, the second spring 39 is put under tension. When the bail bar 30 is released, the second spring 39 compresses biasing the bail bar 30 away from the handle 22 toward the OFF position. The bail bar 30 is biased away from the handle 22 until it contacts a limiting stop 63 in the activator housing 32 preventing further downward travel of the bail bar 30. Movement of the bail bar 30 toward the OFF position allows the first spring 38 to bias the activator button 36 toward the READY orientation and the STOP position.

The second spring 39 cooperates with the bail bar 30 such that the moment the bail bar 30 is released, the second spring 39 biases the bail bar 30 to the OFF position. The first spring 38 can then bias the activator button 36 toward the STOP position deactivating the electric motor 12 and the cutting blade 16. When the activator button 36 is in the STOP position, the first arm 54 is out of alignment with the bail bar 30. Therefore the bail bar 30 can move between the ON and OFF position without activating the electric motor 12.

The activator button 36 has a surface 64 on the second member 50 against which the operator can exert pressure to axially move the activator button 36 to the ACTIVE position.

The detent 42 in the embodiment shown in FIGS. 3, 3A, and 4 is affixed to the activator housing 32 and engages the second arm 56 when the activator button 36 is in the RUN orientation to prevent the first spring 38 from biasing the activator button 36 toward the STOP position. It is also possible for the detent 42 to be affixed to the electrical switch 40 or the handle 22 so long as it prevents the first spring 38 from biasing the activator button 36, when in the RUN orientation, toward the STOP position.

A stop pin 66 shown in FIGS. 3, 3A, and 4 cooperates with the activator button 36 when in the STOP position limiting rotational movement of the first arm 54 in a direction opposite that of the RUN orientation. The bail bar 30 limits rotational movement of the first arm 54 in a direction opposite that of the RUN orientation when the activator button 36 is in the ACTIVE position or READY orientation. This is done to allow the first spring 38 to be maintained under rotational tension in a direction opposite the RUN orientation to ensure that the first spring 38 will bias the activator button 36 toward the READY orientation when the bail bar 30 is released allowing for movement of the activator button 36 toward the STOP position in response to the biasing movement of the first spring 38.

In operation, the operator depresses the activator button 36 by contacting the surface 64 and axially moving the activator button 36 in the first degree of freedom to the ACTIVE position. When while maintaining pressure on the activator button 36 (sufficient to overcome the bias of the first spring 38), the operator pivots the bail bar 30 toward the second end 26 of the handle 22, so as to hold both the handle 22 and the bail bar 30. The action of pivoting the bail bar 30 results in movement of the bail bar 30 from an OFF position to an ON position (as shown in FIG. 1). The first arm 54 and the bail bar 30 are now in axial alignment enabling the bail bar 30 to engage the first arm 54 and rotate the activator button 36 to the RUN orientation. This rotational movement (shown in FIG. 3A) results in the second arm 56 engaging the contact button 58 of the electrical switch 40 which closes the electrical circuit and activates the electric motor 12. The activation of the electric motor 12 drives the cutting blade 16 which cuts the grass. Once the bail bar 30 has been rotated to the ON position, the activator button 36 can be released because the detent 42 will prevent the activator button 36 from being biased toward the STOP position. This allows the operator to place both hands on the second end 26 of the handle 22 and the bail bar 30.

In an alternative embodiment, the bail bar 30 may move axially rather than a pivotally to achieve similar results. In addition, the bail bar 30 does not require the second spring 39 to bias the bail bar 30 toward the OFF position, this can be accomplished by gravity or similar means. The present embodiment as specifically shown in FIGS. 3, 3A, and 4, illustrates the bail bar 30 and the activator button being pivotal about generally parallel axes. It is also possible to pivot the bail bar 30 and the activator button 36 about the same axis to achieve similar results.

While the best mode for carrying out the invention has been described in detail, those familiar with the art to which this invention relates will recognize various alternative designs and embodiments for practicing the invention as defined by the following claims.

What is claimed is:

1. An electric lawn mower comprising:
   an electric motor for driving a cutting blade;
   a mower deck having a plurality of wheels for movably supporting said cutting blade relative to a lawn to be cut;
   a handle having a first end affixed to said mower deck and a second end adapted to cooperate with an operator using said mower;
   a bail bar shiftable with respect to said handle between an ON position and an OFF position;
   an activator button movable with respect to said handle in a first degree of freedom between an ACTIVE position and a STOP position, said activator button movable with respect to said handle when said activator button is in said ACTIVE position for movement in a second degree of freedom between a READY orientation and a RUN orientation in response to movement of said bail bar from said OFF position to said ON position;
   biasing means cooperating with said handle and said activator button for biasing said activator button toward said READY orientation and for biasing said activator button toward said STOP position;
   a normally open electrical switch for activating said electric motor, said switch being closeable only when said activator button is moved to said RUN orientation and said bail bar is shifted to said ON position; and
   a detent cooperating with said switch and said activator button when said activator button is in said RUN orientation to prevent said biasing means from biasing said activator button to said STOP position.

2. The mower of claim 1 including another detent fixed with respect to said handle and cooperating with said activator button only in said STOP position and cooperating with said bail bar only in said ACTIVE position to maintain said activator button in said READY orientation.

3. The mower of claim 1 including a housing mountable on said handle for enclosing said activator button and said biasing means, said housing having a first aperture for guiding movement of said activator button in said first degree of freedom and second degree of freedom and a second aperture for facilitating movement of said bail bar between said ON position and said OFF position, and said housing having a first retaining means cooperating with said biasing means for retaining said biasing means.

4. The mower of claim 3 wherein said first retaining means comprises a retaining pin affixed to said housing for retaining engagement with said biasing means.

5. The mower of claim 3 wherein said housing further includes limiting means cooperating with said bail bar for limiting movement of said bail bar in said ON position and said OFF position.

6. The mower of claim 5 wherein said limiting means comprises surfaces on said housing against which said bail bar abuts in said ON position and said OFF position to limit movement of said bail bar.

7. The mower of claim 1 wherein biasing means comprises a torsion spring for said activator button toward said READY orientation and for biasing said activator button toward said STOP position.

8. The mower of claim 1 wherein said bail bar is pivotally mounted about an axis with respect to said handle for enabling pivotal movement between said ON position and said OFF position.

9. The mower of claim 1 wherein said activator button further comprises:
- a first member slidably and pivotally cooperating with a guide pin affixed with respect to said handle along a central axis enabling said activator button to move axially along said central axis in said first degree of freedom between said ACTIVE position and said STOP position and enabling said activator button to pivot about said central axis in said second degree of freedom between said READY orientation and said RUN orientation;
- a body affixed to said first member, said body having a first arm cooperating with said bail bar enabling movement of said body and said first member in said second degree of freedom between a READY orientation and a RUN orientation in response to movement of said bail bar to said ON position when said activator button is located in said ACTIVE position, said body having a second arm cooperatively engaging said electrical switch when said body and said second member move toward said RUN orientation in response to movement of said bail bar to said ON position, and said body having a second retaining means cooperating with said first retaining means for retaining said biasing means; and
- said activator button having a surface on said second member against which the operator can exert pressure to move said activator button to said ACTIVE position.

10. The mower button of claim 9 wherein said second retaining means comprises a retaining pin affixed to said body.

11. The mower of claim 1 wherein said activator button and said bail bar are pivotally mounted about generally parallel axes.

12. The mower of claim 9 wherein said biasing means comprises a spring cooperating with said guide pin and said first member to bias said activator button in said STOP position when pressure is not executed by the operator on said surface and when said activator button is not enabled by said bail bar for movement to said RUN orientation, said spring surrounding said guide pin and said first member and retained between said first retaining means and said second retaining means.

13. The mower of claim 1 wherein said electrical switch comprises:
- a switch housing affixed with respect to said handle;
- a contact button biased normally open, said contact button being engaged when said activator button is moved to said RUN orientation by said bail bar to close said electrical circuit activating said electric motor to drive said cutting blade.

14. A method of activating an electric lawn mower having an electric motor driving a cutting blade, the cutting blade located below a mower deck having a plurality of wheels for movably supporting said cutting blade relative to a lawn to be cut, the method comprising:
- providing an elongated handle having a first end affixed to said mower deck and a second end cooperating with an operator using said mower;
- depressing an activator button cooperating with said handle to an ACTIVE position, said activator button movable in a first degree of freedom between said ACTIVE position and a STOP position, said activator button movable in a second degree of freedom between a READY orientation and a RUN orientation;
- shifting a bail bar to an ON position while maintaining said activator button in said READY orientation against a biasing means biasing said activator button in said STOP position in said first degree of freedom relative to said handle and biasing said activator button in said READY orientation in said second degree of freedom relative to said handle, said bail bar being shiftable between said ON position and an OFF position;
- activating said lawn mower by engaging a normally open electrical switch with said activator button while said activator button is in said RUN orientation in response to movement of said bail bar to said ON position; and
- preventing said biasing means from biasing said activator button to said STOP position by providing a detent allowing the operator to release said activator button when said activator button is in said RUN position enabling operation of said mower with one hand.

15. A motor starting device for use with an electric lawn mower, comprising:
- a housing adapted to receive a lever shiftable relative said housing between an ON position and a STOP position for activating said starting device;
- means for shiftably fastening said lever for movement between said ON position and said OFF position;
- an activator button movably affixed to said housing, said activator button movable in a first degree of freedom relative to said housing between an ACTIVE position and a STOP position and movable in a second degree of freedom relative said housing between a READY orientation and a RUN orientation in response to movement of said lever to said ON position;

biasing means cooperating with said housing and said activator button for biasing said activator button toward said STOP position and said READY orientation;

a normally open electrical switch on said housing for starting said electric lawn mower, said switch being closeable only when said activator button is moved to said RUN orientation; and a detent cooperating with said housing and said activator button when said activator button is in said RUN orientation to prevent said biasing means from biasing said activator button to said STOP position.

16. A method of closing a switch to start an electric motor at a handle having a bail on a lawn mower having a cutting blade driven by said motor;

an actuator axially moving against a bias into alignment with said switch and said bail;

rotating said actuator with said bail while both are in alignment to close said switch; and preventing said actuator from axially moving out of such alignment in response to said bias only so long as said actuator is rotated by said bail.

* * * * *